N. POWER.
INTERMITTENT MOVEMENT FOR MOTION PICTURE APPARATUS.
APPLICATION FILED FEB. 26, 1909.
1,088,364.
Patented Feb. 24, 1914.
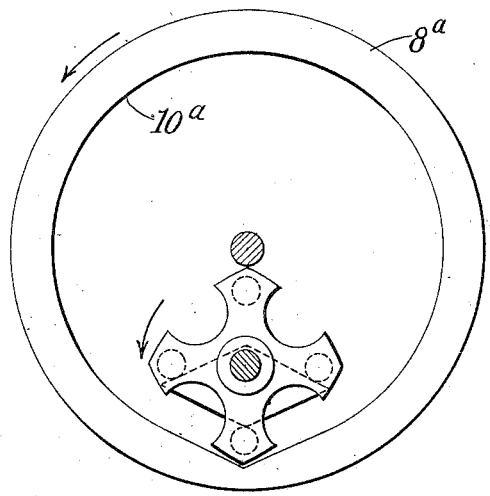
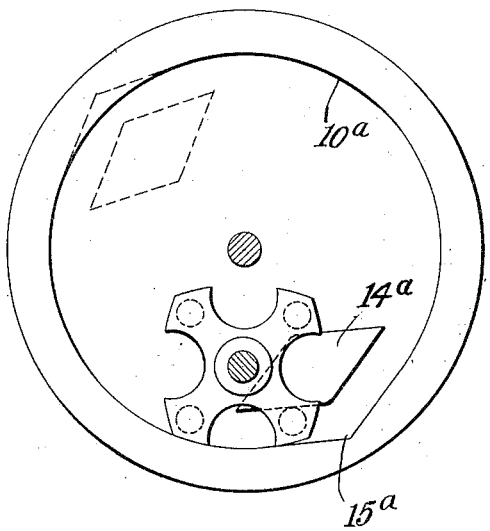
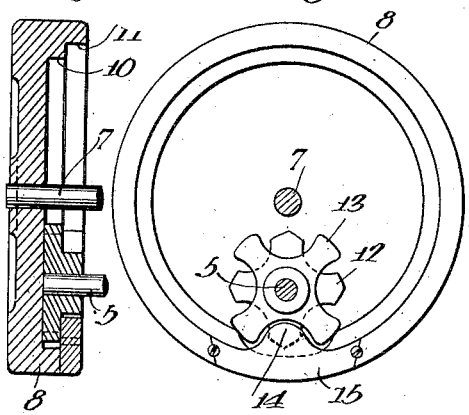
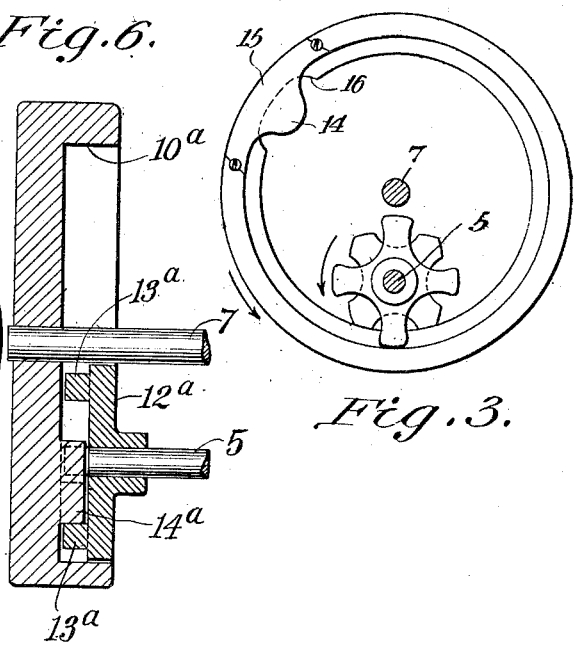

UNITED STATES PATENT OFFICE.

NICHOLAS POWER, OF BROOKLYN, NEW YORK.

INTERMITTENT MOVEMENT FOR MOTION-PICTURE APPARATUS.

1,088,364.  Specification of Letters Patent.  Patented Feb. 24, 1914.

Application filed February 25, 1909. Serial No. 480,277.

*To all whom it may concern:*

Be it known that I, NICHOLAS POWER, a citizen of the United States, and resident of Brooklyn, in the county of Kings and State of New York, have invented certain new and useful Improvements in Intermittent Movements for Motion-Picture Apparatus, of which the following is a specification.

This invention relates to motion picture apparatus and more particularly to a mechanism for imparting intermittent movement to the translucent film.

The invention contemplates the improvement of motion picture apparatus in respect to means employed for imparting intermittent movement to the film by increasing the durability of the film moving mechanism, and by providing means whereby the period of movement of the film may be made short and the period of rest made relatively long.

The invention also contemplates the provision of film moving devices which insure a high degree of accuracy in action together with simplicity of construction.

The invention also contemplates the provision of film actuating devices of such design that the ratio of the period of rest of the film to the period of movement may be made as great as may be desired, and a positive feeding action of the film may be insured at all times.

In the accompanying drawings, I have illustrated the invention as embodied in two different forms of devices for imparting movements of the film, but it will be understood that modifications in the details of construction of the devices embodying the invention may be made without departing from the spirit of the invention.

In the accompanying drawings Figure 1, is a vertical section through the devices for imparting intermittent movement to one of the film feeding sprockets, the section being taken in plane of the axis of the driving shaft, or spindle. Fig. 2, is an elevational view of the devices shown in Fig. 1, looking in the direction indicated by the arrow in Fig. 1. Fig. 3, is an elevational view of the structure shown in Fig. 2, but with the parts in different positions. Figs. 4 and 5, are views analogous to Figs. 2 and 3 illustrating a somewhat different form of mechanism for producing intermittent movement of the film. Fig. 6, is a sectional view of the devices shown in Figs. 4 and 5, the section being taken in the plane of the axis of the driving shaft, or spindle.

Referring to the drawings in which corresponding parts are designated by similar characters of reference in the several views: The sprocket by which intermittent motion is imparted to the film is mounted on the spindle 5, which is mounted in a suitable carriage. This carriage also carries a shaft 7, bearing a flywheel 8 of special construction which will hereinafter be described in detail. Continuous rotation of the shaft 7 is produced through suitable gearing in mesh with the main gear of the machine. The shaft 5 is rotated intermittently and the mechanism for producing this intermittent rotation of the said shaft or spindle comprises the flywheel 8, certain members mounted thereon and certain novel devices on the spindle 5, these parts being illustrated in Figs. 1, 2 and 3. The flywheel 8 is chambered on its inner face to present two shoulders 10 and 11, the purpose of which will hereinafter appear. Mounted on the spindle 5 in position to lie in the chamber of the flywheel are the lock member 12 and actuating member 13, each of which presents a plurality of arms, preferably four. The arms of the locking member 12 are of such length of formation that they lie in contact with the shoulder 10 when the flywheel is in any position but that illustrated in Fig. 2, and while in contact with this shoulder the locking member holds the spindle 7 stationary. The arms of the actuating member 13 are longer than those of the locking member 12 and the two members are set so that the arms of the one lie between the arms of the other, thus bringing one of the arms of the actuating member approximately into contact with the shoulder 11, as shown in Fig. 3. In this position the arm of the actuating member which lies adjacent to the shoulder 11 is in the path of a lug 14 projected toward the center of the flywheel from a member 15 attached to the flywheel so as to form a continuation of the shoulder 11. A notch, or recess, 16 is formed in the shoulder 10 beneath the lug 14, as indicated in Figs. 2 and 3 and, when, in the course of a rotation of the flywheel, the lug 14 engages the actuating member 13, a partial rotation of ninety degrees is imparted to the actuating member, the spindle 5 and to the locking member 12, this movement being permitted by the notch 16 which affords space for the movement of the locking member, as shown in Fig. 2.

From the foregoing description, it will be seen that at each rotation of the flywheel the actuating member and the parts connected therewith are turned through an angle of ninety degrees, and that the period required for this movement is but a small part of the period of rotation of the flywheel, as all the movement of the actuating member 13 and the associated parts takes place during the time required for the passage of the lug 14 past the spindle 5. The movement imparted to the sprocket wheel is accordingly quick and the period of rest of the sprocket wheel is relatively long. When the parts are designed in the proportions shown in the drawings, the period of movement of the sprocket wheel is approximately onetenth as long as the period of rest.

In Figs. 4, 5 and 6 I have illustrated a slightly different construction by which movement is imparted to the spindle 5 with equal quickness but with the production of less noise than is produced by the arrangement of parts shown in Figs. 1, 2 and 3. In Figs. 4, 5 and 6 the flywheel 8ª is chambered somewhat differently from the flywheel 8 already described and presents a single wide shoulder 10ª. Instead of the locking member 12 a larger locking member 12ª is provided and on the face of the locking member, adjacent to the flywheel, are provided four studs 13ª which serve in lieu of the actuating member 13 already described. Instead of the member 15 with its lug 14 a diamond shaped projection 14ª is provided on the inner face of the flywheel in position to engage the pins or studs 13ª as shown in Figs. 4 and 5. Opposite the projection 14ª a notch or recess 15ª is provided to permit rotative movement of the member 12ª as the diamond shaped projection 14ª acts upon the studs or pins 13ª.

It will be noted that the dimensions of the diamond shaped projection 14ª are such that in passing the locking member 12ª the sides of the projection move into engagement with the studs, or pins, with a sliding motion so that there is no blow or shock of impact and in passing out of engagement with the studs, or pins, the diamond shaped projection prevents the locking member from coming violently into contact with the shoulder 10ª. In this way the noise of operation is reduced to a minimum and wear upon the working parts is greatly reduced. The period of the movement of the sprocket, when actuated by the mechanism illustrated in Figs. 4, 5 and 6, in relation to the total period of rotation of the flywheel is substantially the same as when actuated by the mechanism shown in Figs. 1, 2 and 3.

From the foregoing description and the drawings it will be readily seen that the length of the period of the movement of the film depends upon the size of the flywheel and the distance of the sprocket spindle 5 from the flywheel spindle 7, so that by altering these proportions the period of movement of the film in relation to its period of rest may be increased or diminished.

Having thus described my invention what I claim as new and desire to secure by Letters Patent is:

1. In apparatus of the character specified a device for producing intermittent rotation comprising a continuously rotating member having an internal annular shoulder with a notch or recess therein, a rotatable locking member engaging said shoulder and held against rotation thereby, and interengaging devices carried by said locking member and said continuously rotating member by which a partial rotation of 90 degrees is imparted to said locking member when said locking member is adjacent to the notch or recess in said shoulder.

2. In apparatus of the character specified a device for producing intermittent rotation comprising a continuously rotating member having an internal annular shoulder with a notch or recess therein, a rotatable locking member arranged to turn about an axis eccentric to the said continuously rotating member and normally lying in contact with said shoulder and held thereby against rotation, and coöperating members carried by said rotating member and said locking member whereby a partial rotation of 90 degrees is imparted to said locking member when the notch or recess in said shoulder passes said locking member.

3. In apparatus of the character specified a device for producing intermittent rotation comprising a continuously rotating driving shaft and member fixed on said driving shaft and presenting an internal annular shoulder with a gap or recess therein; a driven shaft between the said driving shaft and said shoulder, a locking member mounted on said driven shaft and normally engaging said shoulder and held against rotation thereby; and coöperating devices carried by the member on the driving shaft and by said locking member whereby a partial rotation of 90 degrees is imparted to said locking member as said gap or recess passes the locking member.

4. In apparatus of the character specified, a device for producing intermittent rotation comprising a continuously rotating member having an annular shoulder with a notch or recess therein, a locking member normally engaging said shoulder and held against rotation thereby, a substantially diamond shaped cam carried by said continuously rotating member and a plurality of pins carried by said locking member and adapted to be engaged by said cam to impart a partial rotation to said member when adjacent to the notch or recess in said shoulder.

5. In apparatus of the character specified, a device for producing intermittent rotation comprising a continuously rotating member having an annular shoulder with a notch or recess therein, a rotatable locking member engaging said shoulder during the greater part of the rotation of the continuously rotating member, and having a plurality of projections thereon, and a substantially diamond shaped cam mounted on said continuously rotating member, and adapted to impart a partial rotation to said locking member by engagement with the projections thereon, when said locking member is not in engagement with said shoulder.

Signed at New York city in the county of New York and State of New York this second day of February A. D. 1909.

NICHOLAS POWER.

Witnesses:
BAXTER MORTON,
LAWRENCE W. ATWATER.